United States Patent Office 3,470,150
Patented Sept. 30, 1969

3,470,150
METHOD FOR PRODUCING ORYZANOL
Yasuo Watanabe, 231-7 Mukohara, 3-chome, Itabashiku, Tokyo, Japan; Tsukasa Arawaka, 2113 Kamihoya, Hoyamachi, Kitatamagun, Tokyo, Japan; and Tomio Iwasaki, 11-25 Wakagi, 1-chome, Itabashiku, Tokyo, Japan
No Drawing. Filed Apr. 3, 1967, Ser. No. 627,677
Claims priority, application Japan, Nov. 22, 1966, 41/76,604
Int. Cl. C07g 17/00; A61k 27/00
U.S. Cl. 260—236.5     10 Claims

ABSTRACT OF THE DISCLOSURE

A method for producing crystalline oryzanol comprising subjecting the oryzanol concentrates (including their distillation fractions and residue) obtained by way of the molecular distillation of rice-germ oil, rice-bran oil, rice-bran dark oil or their esters, to fractional extraction by using a petroleum hydrocarbon and furfural as mediums and then adding water to the resultant furfural containing oryzanol to separate crystalline oryzanol.

---

This invention relates to a method for producing crystalline oryzanol by subjecting the oryzanol concentrates obtained by way of the molecular distillation of rice-germ oil, rice-bran oil, rice-bran dark oil or their esters (including their distillation fractions and residue) to fractional ertraction, utilizing the difference of distribution coefficient between a petroleum hydrocarbon and furfural to further concentrate them in the furfural layer and adding water to the resultant furfural containing oryzanol to separate crystalline oryzanol.

Oryzanol has been known as an active principle of pharmaceutical composition effective to disorder of autonomic nervous system or the like.

A method for producing crystalline oryzanol has been developed by the present inventors by adding methanol to a furfural layer obtained in the first step of the above-mentioned process.

However this method has drawback in the difficulty of recovering furfural.

An object of the present invention is to provide a method by which the recovery of furfural is very easy and attractive to be used in the commercial production.

Such an object and other advantages can be attained by the method of the present invention.

After the continued study, the present inventors has succeeded in completing the method of the present invention which enables to obtain crystalline oryzanol easily by adding a large amount of water more than the amount sufficient to saturate the furfural layer. When oryzanol concentrates obtained by the molecular distillation is subjected to fractional extraction utilizing the difference of distribution coefficient between a petroleum hydrocarbon and furfural in order to concentrate the oryzanol in the furfural layer, almost all oryzanol is transferred to the furfural layer but only small amounts of othe oil components are. If furfural saturated with water is used in place of furfural in this case, the concentrating ratio tends to be raised further. This is because oil components other than oryzanol are made more difficult to be transferred to the layer of furfural saturated with water. In this case, furfural saturated with water possesses still a large solubility and does not separate the crystals of oryzanol. But when much water is added to a furfural layer containing concentrated oryzanol, a water layer is separated above the furfural layer. If they are agitated compulsively, the particles of water become minute, being mixed with the furfural layer, and as a result, many crystals of oryzanol, having the particles of water as their nuclei, are produced. When this method is carried out under cooling at a temperature lower than −5° C., the crystals of oryzanol are produced more quickly. Once separated, the crystals are not dissolved unless heated, and by separating them by filtration, they can be easily obtained. If agitation is stopped at a certain extent and they are allowed to stand, the layers of furfural and water are separated but many crystals of oryzanol are separated toward the furfural layer on the boundary surface between the furfural layer and the water layer, growing with the lapse of time. In this case, an ambient temperature may be used but if maintained below 5° C., the crystals are separated at an increased velocity. Oil components other than oryzanol are not separated by cooling because of their large solubility in furfural.

On working the present invention, the compulsive agitation of the furfural layer and water layer and/or cooling is very advantageous because it is very effective in promoting the separation of the crystals of oryzanol. The mechanism that the crystals of oryzanol are not separated from the furfural saturated with water but are easily in the method of the present invention, is not clear theoretically but it can be thought that beside the decreased solubility of oryzanol in furfural some mechanism of surface chemistry also participates in it. That is, furfural and water dissolve each other only slightly but if they are mixed together, their respective surface tensions work on each other, changing the surface tension on the boundary between furfural and water, while furfural is insoluble in water but presents some physico-chemical affinity to water, it can be thought, which may be related to the hydrating property of trieterpene which composes oryzanol or the hydrogen combining hydration of the OH radicals of ferulic acid may be the cause, but anyway the slight hydrating property of oryzanol acts on water and as a result, some change is made in the orientation of oryzanol in the furfural layer, leading to decrease of the solubility of the oryzanol which has been dissolved with strong affinity in furfural and to the separation of the crystals. Further it can be thought that as this happens characteristically for oryzanol alone, only the crystals of oryzanol are separated from the furfural layer and thus the crystalline oryzanol of high purity can be obtained easily.

As for the amounts of a petroleum hydrocarbon and furfural, both the amounts of petroleum hydrocarbon and furfural can be varied in a wide range e.g. from 0.1 to 100 times the weight of oryzanol concentrate containing usually 0.5 to 30 percent by weight of oryzanol. However it is preferable to use one to 10 times petroleum hydrocarbon and one to 10 times furfural relative to the oryzanol concentrate containing usually 0.5 to 30 percent by weight of oryzanol.

According to the present invention, furfural is recovered very easily, to be of great economic advantage for industrial purpose. It is very difficult to separate the mixture of furfural and methanol, by fractional distillation, and a special rectifying column may be necessary for it. But if furfural and water are only used, they can be separated into two phases as they are scarcely miscible in each other, while furfural, as it is, can be used repeatedly.

For a clearer understanding of the present invention, the following examples are given. These examples are intended to be merely illustrative of the present invention and not in limitation thereof. All percents are by weight.

Example 1

Two hundred kg. of the concentrated fraction of oryzanol (the content of oryzanol being 20.2%), not containing substantially fatty acid components, which had been obtained by subjecting rice-bran dark methyl ester oil to molecular distillation with a commercial scale apparatus at 280–300° C., was dissolved in 1,000 l. of n·hexane. The resultant solution, together with 900 l. of furfural saturated with water, was subjected to liquid-liquid extraction with a Podbielniak extractor for liquid-liquid extraction. The furfural layer was separated thereby from the heavy liquid side, and the n·hexane layer from the light liquid side. By subjecting the furfural in the furfural layer to steam distillation about ⅘ by volume of furfural was recovered and it was then concentrated to about ⅓. Next, to the furfural layer, water was added by half of the quantity of furfural, and then rapid agitation was continued. Crystals produced thereby were filtered to collect crystalline oryzanol. The resultant crystals were immediately recrystallized from n·hexane whereby 13.4 kg. of the crystals of oryzanol were obtained (the content of oryzanol being 98.3%).

Example 2

The rice-bran crude oil (acid value being 72, and accordingly free fatty acid being about 34–37% when calculated as linolic acid) which had been dewaxed in advance was subjected to molecular distillation at a distillation temperature of 210° C. to eliminate free fatty acid and some unsaponified matters from it. Twenty g. of the resultant refined oil free from acid (acid value being 0.3 and the content of oryzanol being 5.1%) was dissolved in 100 ml. of petroleum ether. Fifty ml. of furfural was added to the resultant solution and a liquid-liquid extraction was carried out with a separating funnel. Furfural, the lower layer, was withdrawn and petroleum, the upper layer, to which 50 ml. of furfural, had been added, was subjected to a second liquid-liquid extraction. The furfural layers of the first and the second extraction, were combined. 30 ml. of water was added to this combined layer and the whole were allowed to stand in a refrigerator at −5° C. for one over-night, after they were agitated for one hour. As a result, the crystals of oryzanol were obtained by 0.49 g. (melting point: 125–140° C.). By the recrystallization, its needle crystals were obtained (melting point: 130–131° C.).

What is claimed is:

1. A method for producing crystalline oryzanol which comprises subjecting the oryzanol concentrates obtained by way of the molecular distillation of a member selected from the group consisting of rice-germ oil, rice-bran oil, rice-bran dark oil and their esters to fractional extraction utilizing the difference of distribution coefficient between a saturated aliphatic petroleum hydrocarbon and furfural to further concentrate them in the furfural layer and then adding water to the resultant furfural in amounts more than that sufficient to saturate the furfural layer to separate and collect the crystalline oryzanol.

2. A method for producing crystalline oryzanol which comprises subjecting the oryzanol concentrates containing from 0.5 to 30 percent by weight of oryzanol obtained by way of the molecular distillation of a member selected from the group consisting of rice-germ oil, rice-bran oil, rice-bran dark oil and their esters, to fractional extraction by using from one to 10 times furfural and from one to 10 times a saturated aliphatic petroleum hydrocarbon relative to the weight of said oryzanol concentrates to further concentrate them in the furfural layer and then adding water to the resultant furfural containing oryzanol in amounts more than that sufficient to saturate the furfural layer to separate and collect the crystalline oryzanol.

3. A method for producing crystalline oryzanol which comprises subjecting the oryzanol concentrates containing from 0.5 to 30 percent by weight of oryzanol obtained by way of the molecular distillation of a member selected from the group consisting of rice-germ oil, rice-bran oil, rice-bran dark oil and their ester to fractional extraction by using from one to 10 times furfural and from one to 10 times a saturated aliphatic petroleum hydrocarbon relative to the weight of said oryzanol concentrates to further concentrate them in the furfural layer and adding water to the resultant furfural containing oryzanol in amounts more than that sufficient to saturate the furfural layer and then maintaining the system of furfural-oryzanol-water at a temperature lower than 5° C. in order to enhance the separation velocity of oryzanol crystal.

4. The method of claim 1 wherein said saturated aliphatic petroleum hydrocarbon is hexane.

5. The method of claim 1 wherein said saturated aliphatic petroleum hydrocarbon is petroleum ether.

6. The method of claim 2 wherein said saturated aliphatic petroleum hydrocarbon is hexane.

7. The method of claim 2 wherein said saturated aliphatic petroleum hydrocarbon is petroleum ether.

8. The method of claim 3 wherein said saturated aliphatic petroleum hydrocarbon is hexane.

9. The method of claim 3 wherein said saturated aliphatic petroleum hydrocarbon is petroleum ether.

10. The method of claim 1 wherein the furfural is saturated with water.

References Cited

UNITED STATES PATENTS 3,354,143    11/1967    Tabuko et al. _____ 260—236.5

OTHER REFERENCES

Tsuchiya et al.: Chemical Abstracts, vol. 52 (1958), p. 5758.

JAMES A. PATTEN, Primary Examiner

U.S. Cl. X.R.

260—299